G. W. POFFINBARGER.
LOCKING NUT AND BOLT.
APPLICATION FILED NOV. 23, 1908.
932,572. Patented Aug. 31, 1909.
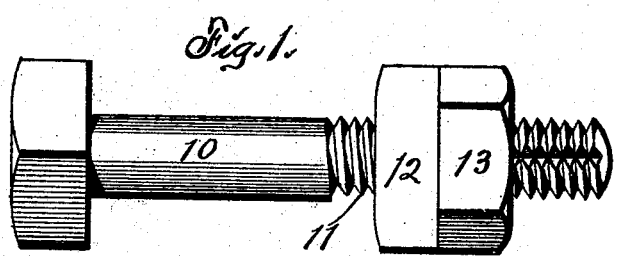
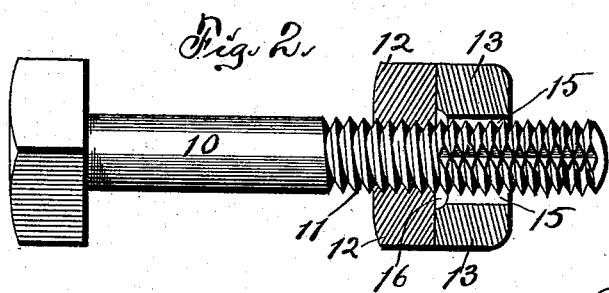
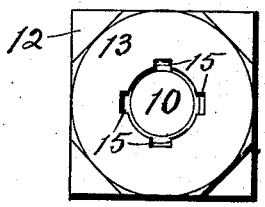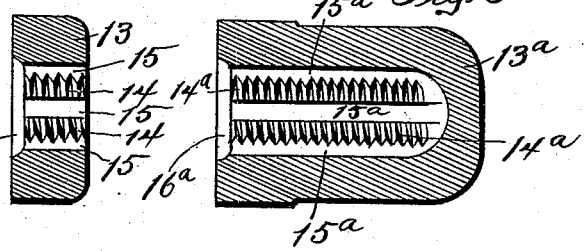
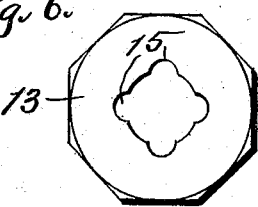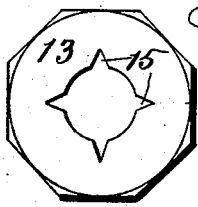
Witnesses:
R. H. Orwig,
W. W. Fink
Inventor:
George W. Poffinbarger,
By Thomas G. Orwig & Co.,
Attys

UNITED STATES PATENT OFFICE.

GEORGE W. POFFINBARGER, OF WINTERSET, IOWA, ASSIGNOR OF ONE-THIRD TO F. H. McKIN-ZIE, OF WINTERSET, IOWA.

LOCKING-NUT AND BOLT.

932,572.  Specification of Letters Patent.  Patented Aug. 31, 1909.

Application filed November 23, 1908. Serial No. 464,490.

*To all whom it may concern:*

Be it known that I, GEORGE W. POFFIN-BARGER, citizen of the United States, residing at Winterset, in the county of Madison and State of Iowa, have invented a new and useful Locking-Nut and Bolt, of which the following is a specification.

The object of this invention is to provide improved means for locking a nut on a bolt. A further object of this invention is to provide an improved construction for a locking nut.

My invention consists in the construction, arrangement and combination of elements hereinafter set forth, pointed out in my claims and illustrated by the accompanying drawings, in which—

Figure 1 is a side elevation of a bolt and two nuts mounted thereon. Fig. 2 is a similar view showing the nuts in diametrical section. Fig. 3 is an end elevation of the devices shown in Fig. 1. Fig. 4 is a diametrical section of the locking nut. Fig. 5 is a diametrical section of a locking nut involving the same improvement but of cap form. Figs. 6 and 7 are end views of nuts of slightly modified form.

In the construction of the device as shown in Figs. 1, 2, 3 and 4, the numeral 10 designates a bolt formed with a thread 11 of any desired pitch and a continuous direction. A nut 12 of common form is provided with an interior thread mating the thread 11. A locking nut 13 is provided and is formed with an interior thread 14 of the same pitch but opposite direction relative to the thread on the interior of the nut 12. The locking nut 13 also is formed with a plurality of grooves 15 parallel with its axis and opening to the interior opening or bolt hole of the nut and intersecting or traversing the thread 14. The locking nut 13 also is formed with a countersink 16 at one end of the opening or bolt hole therein.

The grooves 15 may be square in cross-section as shown in Fig. 3, or they may be curved or V-shaped as shown in Figs. 6 and 7, or of any desired shape. It is the function of the grooves 15 to bisect or cut the continuity of the thread 14 and the threaded portion of the locking nut is hardened somewhat relatively to the remainder of the nut. Thus the locking nut 13 partakes of the characteristics of a thread-cutting die and the counter sink 16 in one end thereof prevents cutting of the threads across entirely to the outer end of the nut 12.

The locking nut may be made of cap form 13ª, as shown in Fig. 5, and be provided with the bolt hole, the grooves 15ª opening thereinto, the thread 14ª in the bolt hole and the countersink 16ª at the open end of the bolt hole.

In practical use the nut 12 is screwed on the bolt 10 in the direction of the thread 11 to the desired extent. Then the locking nut 13 is screwed by hand on the bolt 10 in the direction of the thread 14, which is opposite to the direction of the thread 11, and the thread 14 starts because of the grooves 15 spanning the thread 11 and cuts across the thread 11 and seats the locking nut in contact with the nut 12.

Any desired shape or configuration may be given to the outer end of the nut 13ª.

I claim as my invention—

1. A locking nut and bolt, comprising a bolt formed with a single thread, a nut mating with and adapted to be screwed on the thread of said bolt, and a locking nut formed with a thread opposite to the thread of the bolt and also formed with grooves parallel with its axis and crossing the thread thereof.

2. A locking nut and bolt, comprising a bolt formed with a single thread, a nut mating with and adapted to be screwed on the thread of said bolt, and a locking nut formed with a thread opposite to the thread of the bolt and also formed with a countersink at one end of the bolt hole therein.

3. A locking nut and bolt, comprising a bolt formed with a single thread, a nut mating with and adapted to be screwed on the thread of said bolt, and a locking nut formed with a thread opposite to the thread of the bolt, and also formed with grooves bisecting said thread, and also formed with a countersink at one end of the bolt hole therein, said locking nut adapted to be oppositely screwed on the bolt.

GEORGE W. POFFINBARGER.

Witnesses:
  S. C. SWEET,
  F. H. McKINZIE.